US012187069B2

(12) United States Patent
Wang et al.

(10) Patent No.: US 12,187,069 B2
(45) Date of Patent: Jan. 7, 2025

(54) MULTI-POSTURE BEDSIDE WRITING PEN

(71) Applicant: Ningbo Institute of Northwestern Polytechnical University, Zhejiang (CN)

(72) Inventors: Minqing Wang, Shaanxi (CN); Qian Wang, Shaanxi (CN)

(73) Assignee: Ningbo Institute of Northwestern Polytechnical University, Ningbo (CN)

( * ) Notice: Subject to any disclaimer, the term of this patent is extended or adjusted under 35 U.S.C. 154(b) by 0 days.

(21) Appl. No.: 18/464,809

(22) Filed: Sep. 11, 2023

(65) Prior Publication Data

US 2024/0140130 A1 May 2, 2024

(30) Foreign Application Priority Data

Oct. 27, 2022 (CN) ......................... 202211322620.8

(51) Int. Cl.

*B43K 5/00* (2006.01)
*B43K 8/00* (2006.01)
*B43K 8/02* (2006.01)
*B43K 8/03* (2006.01)
*B43K 8/06* (2006.01)
*B43K 23/12* (2006.01)

(52) U.S. Cl.

CPC .............. *B43K 8/022* (2013.01); *B43K 8/003* (2013.01); *B43K 8/03* (2013.01); *B43K 23/12* (2013.01)

(58) Field of Classification Search

CPC ........... B43K 8/02; B43K 8/022; B43K 23/12
USPC .................................................. 401/195, 198
See application file for complete search history.

(56) References Cited

U.S. PATENT DOCUMENTS

| | | | | |
|---|---|---|---|---|
| 10,919,335 B2 * | 2/2021 | Wen | ......................... | B43K 7/10 |
| 2024/0140129 A1 * | 5/2024 | Sheng | ...................... | B43K 7/04 |

FOREIGN PATENT DOCUMENTS

| | | | |
|---|---|---|---|
| CN | 106240194 A | | 12/2016 |
| JP | S53105830 U | | 8/1978 |
| JP | H0276024 U | | 6/1990 |
| JP | 200110276 | | 1/2001 |

* cited by examiner

*Primary Examiner* — Jennifer C Chiang
(74) *Attorney, Agent, or Firm* — Pilloff Passino & Cosenza LLP; Rachel Pilloff; Sean Passino

(57) ABSTRACT

A multi-posture bedside writing pen includes a pen shell, a pen tip holder, a fiber rod and a fiber ink storage tube. The fiber ink storage tube is connected with the pen shell and located in the pen shell. The pen tip holder is connected with one end of the pen shell. The pen tip holder is axially provided with a through hole. The fiber rod is inserted into the through hole, one end of the fiber rod is exposed outside the pen tip holder, and an other end of the fiber rod is inserted into the fiber ink storage tube. A first gap is provided between the pen tip holder and the fiber ink storage tube.

9 Claims, 3 Drawing Sheets

MULTI-POSTURE BEDSIDE WRITING PEN

CROSS-REFERENCE TO RELATED APPLICATIONS

This application claims priority of Chinese Patent Application No. 202211322620.8, filed on Oct. 27, 2022, the entire contents of which are incorporated herein by reference.

TECHNICAL FIELD

The application relates to the technical field of stationery, and in particular to a multi-posture bedside writing pen.

BACKGROUND

As a writing tool, refills are widely used in daily life, study and office. Common refills include a refill tube and a refill head, which are connected by threads. The refill tube is filled with writing liquid, and the refill head is filled with steel balls. When writing, the liquid in the refill tube slowly flows out through the steel balls at the front end of the refill head for writing purpose. At present, the common pens and ballpoint pens mostly make use of gravity of droplets to discharge ink from the tip, so they cannot be used in case of no gravity or anti-gravity. The bedside writing pen is a pen that is capable of being used in the posture of lying on the bed, and the bedside writing pen is required to be clean and not leak ink under the anti-gravity state. Therefore, traditional pens and ballpoint pens are not suitable in the posture of lying on the bed, while pencils are capable of being used under the anti-gravity condition, but because the pencil refill is easy to break, the broken pencil refill may fall into the respiratory tract, which has potential safety hazards. At present, space pens for microgravity or gravity-free conditions in space have been invented in the aviation field at home and abroad. For example, China patent CN106240194A discloses a new type of space pen refill, which is provided with a movable inner plug, a first grease layer and a second grease layer, and uses a spring to provide elastic pressure to the inner plug to realize writing under gravity-free, microgravity or anti-gravity conditions, and avoids the leakage of ink, so it is suitable for bedside writing. However, these space pens are complicated in structure and technology, which leads to high costs and prices, and also brings inconvenience to users.

SUMMARY

Aiming at the shortcomings of the prior art, the application aims to provide a multi-posture bedside writing pen with simple structure and low costs.

In order to solve the above technical problems, the application provides a multi-posture bedside writing pen, which includes a pen shell, a pen tip holder, a fiber rod and a fiber ink storage tube. The fiber ink storage tube is connected with the pen shell and located in the pen shell. The pen tip holder is connected with one end of the pen shell. The pen tip holder is axially provided with a through hole. The fiber rod is inserted into the through hole. One end of the fiber rod is exposed outside the pen tip holder, and the other end of the fiber rod is inserted into the fiber ink storage tube. A first gap is provided between the pen tip holder and the fiber ink storage tube. The pen tip holder is inserted into one end of the pen shell, and the outer peripheral wall of the fiber rod is coated with a leak-proof membrane. The leak-proof membrane is located in the first gap, and the outer peripheral wall of the fiber rod located in the first gap is coated with a leak-proof membrane.

After adopting the above structure, the multi-posture bedside writing pen has the following advantages: the fiber rod is used as a writing refill, one end of the fiber rod exposed outside the pen tip holder is the pen tip, and the fiber ink storage tube stores ink and by using the siphon bionics principle, the limitation of ink injection of ordinary pens by gravity is overcome, and the fiber rod is supplied with ink, which not only realizes writing while sitting, but also ensures the requirement of people to write while lying down when reading or working at the bedside, thus realizing multi-posture writing. The first gap is provided between the pen tip holder and the fiber ink storage tube, which avoids the contact between the pen tip holder and the fiber ink storage tube and prevents ink leakage. The leak-proof membrane on the outer peripheral wall of the fiber rod is capable of preventing the ink on the fiber rod from leaking between the pen tip holder and the pen shell, which meets the requirements of environmental sanitation when the bedside pen is used. Moreover, the overall structure is simple and the production cost is greatly reduced.

As an improvement, a second gap is provided between one end of the leak-proof membrane close to the fiber ink storage tube and the fiber ink storage tube, and the width a of the second gap is less than 1 millimeter. By adopting this structure, the second gap is arranged to avoid the contact between the leak-proof membrane and the fiber ink storage tube, and the purpose of clean writing is achieved without affecting ink introducing.

As an improvement, the leak-proof membrane is integrally formed with the fiber rod. By adopting this structure, the structure is simpler and the assembly process is simplified.

As an improvement, the pen shell includes a cylindrical section and a first tapered section. The first tapered section is connected with the cylindrical section, and the first tapered section is located between the cylindrical section and the pen tip holder. The diameter of the first tapered section gradually decreases from one end close to the cylindrical section to one end away from the cylindrical section. The outer diameter of the fiber ink storage tube is smaller than the maximum inner diameter of the first tapered section and larger than the minimum inner diameter of the first tapered section. The outer peripheral wall of one end of the fiber ink storage tube close to the pen tip holder is in interference fit with the inner wall of the first tapered section. By adopting this structure, the fiber ink storage tube is clamped by the inner wall of the first tapered section, and there is no need to additionally arrange a limiting mechanism, thus further simplifying the overall structure.

As an improvement, the pen shell further includes a second tapered section. One end of the second tapered section is connected with the first tapered section. The diameter of the second tapered section gradually decrease from one end close to the first tapered section to one end away from the first tapered section. A flange is arranged on the outer peripheral wall of the pen tip holder along the circumferential direction, and the pen tip holder is inserted into the other end of the second tapered section and the flange abuts against the other end of the second tapered section. With this structure, the second tapered section is capable of reducing the volume of the pen shell near the pen tip, which is convenient for grasping and using.

As an improvement, the other end of the pen shell is detachably connected with a back cover. With this structure, the back cover plays a role in sealing and protecting the other end of the pen shell, and it is also convenient to replace the fiber ink storage tube.

As an improvement, one end of the pen shell is sleeved with a pen cap, and the pen tip holder and the pen tip of the fiber rod are both located in the pen cap. With this structure, the pen cap protects one end of the pen shell and the pen tip of the fiber rod.

As an improvement, the distance b between the end of the fiber ink storage tube close to the pen tip holder and the end of the fiber rod away from the fiber ink storage tube is less than 5 millimeters. With this structure, when writing in a lying posture, the long transport distance will make the speed of transporting ink by capillary action fail to catch up with the speed of ink consumption caused by people's writing, so the ink transport distance is shortened by controlling the distance between the fiber ink storage tube and the pen tip of the fiber rod to ensure uninterrupted writing.

DETAILED DESCRIPTION OF THE EMBODIMENTS

A multi-posture bedside writing pen of the present application will be described in detail with reference to the attached drawings.

Figure 1:
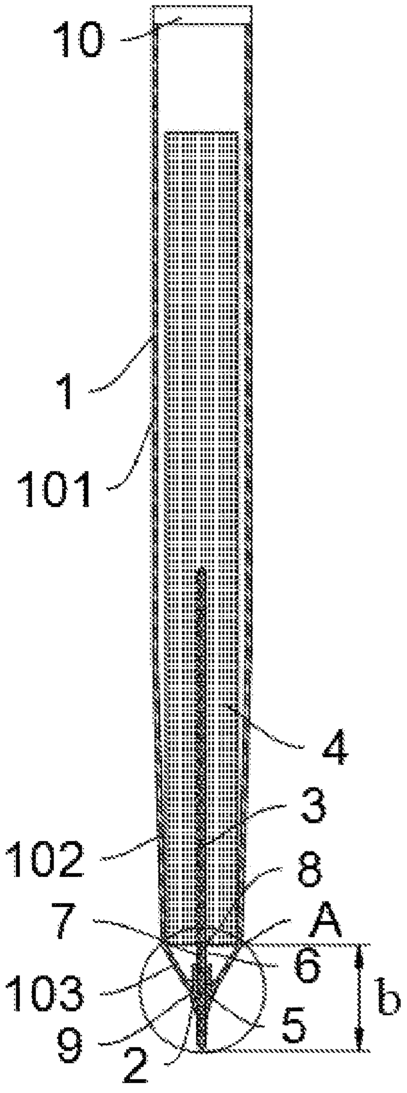
FIG. 1 is a schematic structural diagram of a pen shell in the present application.
Figure 2:
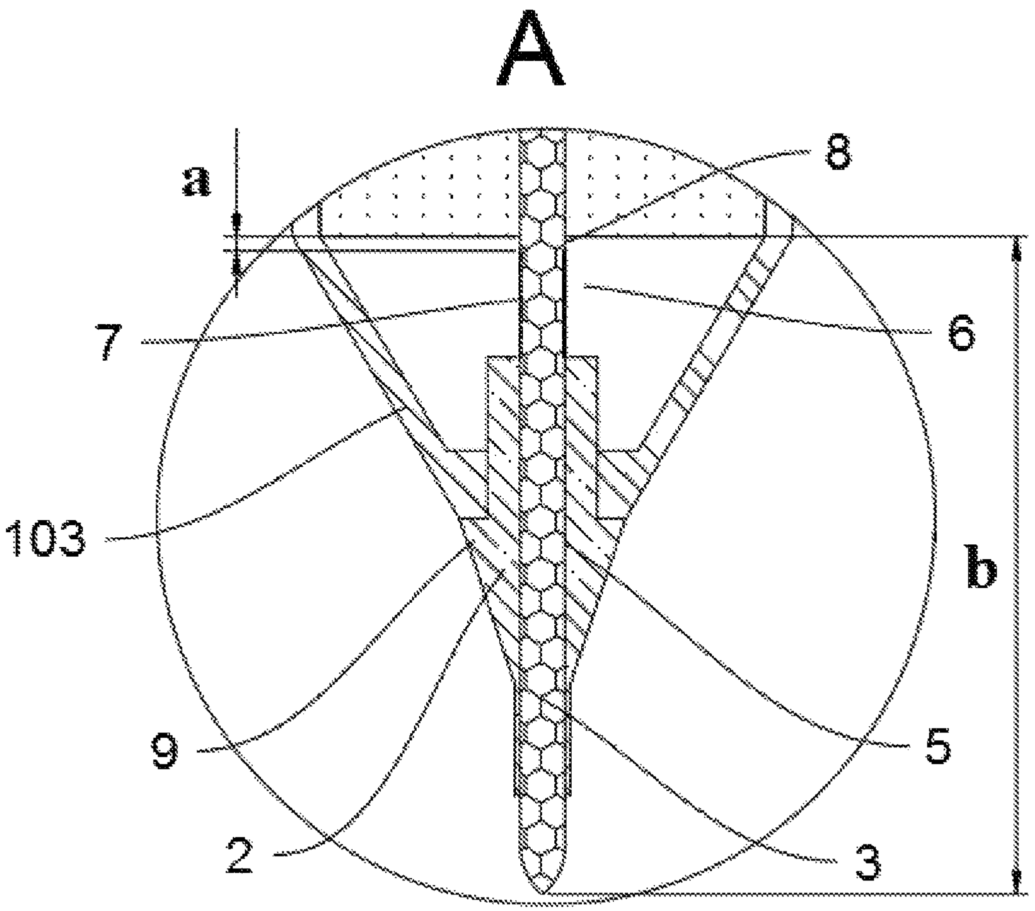
FIG. 2 is a partial enlarged view of part A in FIG. 1.
Figure 3:
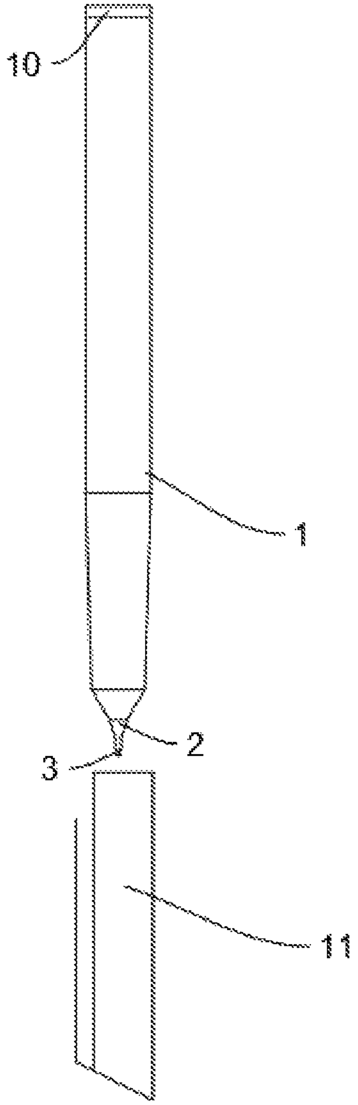
FIG. 3 is a schematic diagram of an overall structure of the present application.

As shown in FIG. 1, FIG. 2 and FIG. 3, a multi-posture bedside writing pen includes a pen shell 1, a pen tip holder 2, a fiber rod 3 and a fiber ink storage tube 4. The fiber ink storage tube 4 is connected with the pen shell 1 and located in the pen shell 1. The pen tip holder 2 is inserted into one end of the pen shell 1, and the pen tip holder 2 is in interference fit with one end of the pen shell 1. The pen shell 1 has a hollow structure. The pen shell 1 includes a cylindrical section 101, a first tapered section 102 and a second tapered section 103. The first tapered section 102 is connected with the cylindrical section 101. The first tapered section 102 is located between the cylindrical section 101 and the pen tip holder 2. The diameter of the first tapered section 102 gradually decreases from one end close to the cylindrical section 101 to one end away from the cylindrical section 101. The outer diameter of the fiber ink storage tube 4 is smaller than the maximum inner diameter of the first tapered section 102 and larger than the minimum inner diameter of the first tapered section 102. The outer peripheral wall of one end of the fiber ink storage tube 4 close to the pen tip holder 2 is in interference fit with the inner wall of the first tapered section 102. One end of the second tapered section 103 is connected with the first tapered section 102, and the diameter of the second tapered section 103 gradually decreases from one end close to the first tapered section 102 to one end away from the first tapered section 102. A flange 9 is arranged on the outer peripheral wall of the pen tip holder 2 in the circumferential direction. The pen tip holder 2 is inserted into the other end of the second tapered section 103. The flange 9 abuts against the other end of the second tapered section 103. As shown in FIG. 1, the cylindrical section 101, the first tapered section 102 and the second tapered section 103 are sequentially arranged from top to bottom. The upper and lower ends of the first tapered section 102 are respectively connected with the lower end of the cylindrical section 101 and the upper end of the second tapered section 103. The inner diameter and outer diameter of the first tapered section 102 and the inner diameter and outer diameter of the second tapered section 103 decrease gradually from top to bottom. The whole fiber ink storage tube 4 is located in the cylindrical section 101 and the first tapered section 102. Preferably, the outer peripheral wall of the lower end of the fiber ink storage tube 4 is clamped on the inner wall close to the lower end of the first tapered section 102, while the pen tip holder 2 is inserted into the lower end face of the second tapered section 103, and the upper end face of the flange 9 abuts against the lower end face of the second tapered section 103. In addition, the outer peripheral wall of the flange 9 is also a tapered surface, and the slope of the outer peripheral wall of the flange 9 is preferably the same as the slope of the second tapered section 103, and the outer peripheral wall of the second tapered section 103 is flush with the outer peripheral wall of the flange 9. In other words, there is no offset between the outer peripheral wall of the second tapered section 103 and the outer peripheral wall of the flange 9.

As shown in FIG. 1 and FIG. 2, the pen tip holder 2 is axially provided with a through hole 5, and the fiber rod 3 is inserted into the through hole 5, and one end of the fiber rod 3 is exposed outside the pen tip holder 2, and the other end of the fiber rod 3 is inserted into the fiber ink storage tube 4. In other words, the upper end of the fiber rod 3 is inserted into the fiber ink storage tube 4, while the lower end of the fiber rod 3 is exposed outside the pen tip holder 2 as a writing pen tip. The upper end of the fiber rod 3 is preferably tapered for easily inserting into the fiber ink storage tube 4, and the lower end of the fiber rod 3 is preferably arch-shaped for convenient writing. A first gap 6 is provided between the pen tip holder 2 and the fiber ink storage tube 4. The pen tip holder 2 is made of a metal material. By arranging the metal pen tip holder 2 with a thin-walled structure and with certain elasticity, the fiber rod 3 is able to be fixed stably and it is easy to insert and remove the fiber rod 3.

As shown in FIG. 2, the outer peripheral wall of the fiber rod 3 located in the first gap 6 is coated with a leak-proof membrane 7. In this embodiment, the lower end of the leak-proof membrane 7 abuts against the upper end of the pen tip holder 2. A second gap 8 is provided between one end of the leak-proof membrane 7 close to the fiber ink storage tube 4 and the fiber ink storage tube 4. The width a of the second gap 8 is less than 1 millimeter. In other words, the upper end of the leak-proof membrane 7 does not contact with the lower end of the fiber ink storage tube 4, leaving the second gap 8. On the premise that the upper end of the leak-proof membrane 7 is not in contact with the lower end of the fiber ink storage tube 4, the width a of the second gap 8 is selected as small as possible, preferably less than 0.5 millimeter, so as to ensure the stable ink supply to the fiber rod 3 by the fiber ink storage tube 4. The leak-proof membrane 7 is integrally formed with the fiber rod 3.

As shown in FIG. 1 and FIG. 3, the other end of the pen shell 1 is detachably connected with a back cover 10, and one end of the pen shell 1 is sleeved with a pen cap 11, and the pen tip holder 2 and the pen tip of the fiber rod 3 are both located in the pen cap 11. In other words, the upper end of the pen shell 1 is connected with the back cover 10, and the lower end of the pen shell 1 is sleeved with the pen cap 11 to protect the pen tip holder 2 and the pen tip of the fiber rod 3.

When writing is done in a lying posture, the excessively long transport distance will make the speed of transporting ink by capillary action fail to catch up with the ink consumption speed caused by people's writing. Therefore, the transport distance of ink is capable of being shortened by controlling the distance between the fiber ink storage tube 4 and the pen tip of the fiber rod 3, so as to ensure uninterrupted writing. As shown in FIG. 1 and FIG. 2, the distance b between one end of the fiber ink storage tube 4 close to the pen tip holder 2 and one end of the fiber rod 3 away from the fiber ink storage tube 4 is less than 5 millimeters, that is, the distance b between the lower end of the fiber ink storage tube 4 and the lower end of the fiber rod 3 is less than 5 millimeters.

As a writing refill, the fiber rod 3, the end of which is exposed outside the pen tip holder 2, is the pen tip, and the fiber ink storage tube 4 stores ink. The fiber rod 3 is made of carbon fiber material with capillary holes. By using the siphon bionics principle, it is able to overcome the limitation of gravity ink injection of ordinary pens, realize multi-posture writing when people read at the bedside, and has a simple overall structure, greatly reducing the production cost.

The embodiment of the present application has been described in detail above with reference to the attached drawings, but the present application is not limited to the above one embodiment, and all other embodiments obtained by those skilled in the art without creative labor belong to the scope of protection of the present application.

What is claimed is:

1. A multi-posture bedside writing pen, comprising: a pen shell, a pen tip holder, a fiber rod and a fiber ink storage tube, wherein the fiber ink storage tube is connected with the pen shell and located in the pen shell, the pen tip holder is connected with one end of the pen shell, the pen tip holder is axially provided with a through hole, the fiber rod is inserted into the through hole, one end of the fiber rod is exposed outside the pen tip holder, and an other end of the fiber rod is inserted into the fiber ink storage tube, a first gap is provided between the pen tip holder and the fiber ink storage tube, the pen tip holder is inserted into one end of the pen shell, and an outer peripheral wall of the fiber rod located in the first gap is coated with a leak-proof membrane;

wherein a second gap is provided between one end of the leak-proof membrane close to the fiber ink storage tube and the fiber ink storage tube, and a width a of the second gap is less than 1 millimeter.

2. The multi-posture bedside writing pen according to claim 1, wherein the leak-proof membrane is integrally formed with the fiber rod.

3. The multi-posture bedside writing pen according to claim 1, wherein the pen shell comprises a cylindrical section and a first tapered section, the first tapered section is connected with the cylindrical section, and the first tapered section is located between the cylindrical section and the pen tip holder, a diameter of the first tapered section gradually decreases from one end close to the cylindrical section to one end away from the cylindrical section, an outer diameter of the fiber ink storage tube is smaller than a maximum inner diameter of the first tapered section and larger than a minimum inner diameter of the first tapered section, and an outer peripheral wall of one end of the fiber ink storage tube close to the pen tip holder is in interference fit with an inner wall of the first tapered section.

4. The multi-posture bedside writing pen according to claim 3, wherein the pen shell further comprises a second tapered section, one end of the second tapered section is connected with the first tapered section, a diameter of the second tapered section gradually decrease from one end close to the first tapered section to one end away from the first tapered section, a flange is arranged on an outer peripheral wall of the pen tip holder along a circumferential direction, and the pen tip holder is inserted into an other end of the second tapered section and the flange abuts against the other end of the second tapered section.

5. The multi-posture bedside writing pen according to claim 1, wherein an other end of the pen shell is detachably connected with a back cover.

6. The multi-posture bedside writing pen according to claim 1, wherein the one end of the pen shell is sleeved with a pen cap, and the pen tip holder and a pen tip of the fiber rod are both located in the pen cap.

7. The multi-posture bedside writing pen according to claim 1, wherein a distance b between the one end of the fiber ink storage tube close to the pen tip holder and the one end of the fiber rod away from the fiber ink storage tube is less than 5 millimeters.

8. A multi-posture bedside writing pen, comprising: a pen shell, a pen tip holder, a fiber rod and a fiber ink storage tube, wherein the fiber ink storage tube is connected with the pen shell and located in the pen shell, the pen tip holder is connected with one end of the pen shell, the pen tip holder is axially provided with a through hole, the fiber rod is inserted into the through hole, one end of the fiber rod is exposed outside the pen tip holder, and an other end of the fiber rod is inserted into the fiber ink storage tube, a first gap is provided between the pen tip holder and the fiber ink storage tube, the pen tip holder is inserted into one end of the pen shell, and an outer peripheral wall of the fiber rod located in the first gap is coated with a leak-proof membrane;

wherein the pen shell comprises a cylindrical section and a first tapered section, the first tapered section is connected with the cylindrical section, and the first tapered section is located between the cylindrical section and the pen tip holder, a diameter of the first tapered section gradually decreases from one end close to the cylindrical section to one end away from the cylindrical section, an outer diameter of the fiber ink storage tube is smaller than a maximum inner diameter of the first tapered section and larger than a minimum inner diameter of the first tapered section, and an outer peripheral wall of one end of the fiber ink storage tube close to the pen tip holder is in interference fit with an inner wall of the first tapered section; and wherein the pen shell further comprises a second tapered section, one end of the second tapered section is connected with the first tapered section, a diameter of the second tapered section gradually decrease from one end close to the first tapered section to one end away from the first tapered section, a flange is arranged on an outer peripheral wall of the pen tip holder along a circumferential direction, and the pen tip holder is inserted into an other end of the second tapered section and the flange abuts against the other end of the second tapered section.

9. A multi-posture bedside writing pen, comprising: a pen shell, a pen tip holder, a fiber rod and a fiber ink storage tube, wherein the fiber ink storage tube is connected with the pen shell and located in the pen shell, the pen tip holder is connected with one end of the pen shell, the pen tip holder is axially provided with a through hole, the fiber rod is inserted into the through hole, one end of the fiber rod is exposed outside the pen tip holder, and an other end of the fiber rod is inserted into the fiber ink storage tube, a first gap is provided between the pen tip holder and the fiber ink storage tube, the pen tip holder is inserted into one end of the pen shell, and an outer peripheral wall of the fiber rod located in the first gap is coated with a leak-proof membrane;

wherein a distance b between the one end of the fiber ink storage tube close to the pen tip holder and the one end of the fiber rod away from the fiber ink storage tube is less than 5 millimeters.

* * * * *